(12) United States Patent
Taylor et al.

(10) Patent No.: US 11,220,336 B2
(45) Date of Patent: Jan. 11, 2022

(54) STRUCTURE FOR CONTROLLING THE AERO-ACOUSTIC ENVIRONMENT IN AN AIRCRAFT WEAPONS BAY

(71) Applicant: MBDA UK Limited, Hertfordshire (GB)

(72) Inventors: Nigel John Taylor, Bristol (GB); Benjamin James Newby, Bristol (GB)

(73) Assignee: MBDA UK Limited, Hertfordshire (GB)

( * ) Notice: Subject to any disclaimer, the term of this patent is extended or adjusted under 35 U.S.C. 154(b) by 57 days.

(21) Appl. No.: 16/567,955

(22) Filed: Sep. 11, 2019

(65) Prior Publication Data

US 2020/0086990 A1    Mar. 19, 2020

Related U.S. Application Data

(63) Continuation of application No. 15/854,471, filed on Dec. 26, 2017, now Pat. No. 10,442,534, which is a (Continued)

(30) Foreign Application Priority Data

Jan. 6, 2014    (GB) ..................... 1400179

(51) Int. Cl.
*B64D 1/06*   (2006.01)
*B64D 1/04*   (2006.01)
(Continued)

(52) U.S. Cl.
CPC ............... *B64D 1/06* (2013.01); *B64D 1/04* (2013.01); *B64D 1/08* (2013.01); *B64D 1/10* (2013.01); *B64D 7/08* (2013.01)

(58) Field of Classification Search
CPC ... B64D 1/06; B64D 1/08; B64D 1/10; B64D 1/04; B64D 7/08; G10K 11/16
See application file for complete search history.

(56) References Cited

U.S. PATENT DOCUMENTS 2,749,064 A * 6/1956 Kuhlman, Jr. ........... B64D 1/06
                                                      244/137.1
2,791,387 A    5/1957 Weinberg
(Continued)

FOREIGN PATENT DOCUMENTS

EP    2778045 A1    9/2014
FR    2899992 A1    10/2007
(Continued)

OTHER PUBLICATIONS

Search Report from the Intellectualy Property Office of the United Kingdom, Application No. GB1500064.9, completed on Jun. 18, 2015, 4 pages.

*Primary Examiner* — Assres H Woldemaryam
(74) *Attorney, Agent, or Firm* — Faegre Drinker Biddle & Reath LLP

(57) ABSTRACT

An aircraft comprises a weapons bay, the weapons bay comprising a cavity having an opening through which stores may be deployed, and a door assembly for exposing/closing the opening of the cavity. A first store is held in the cavity via a launcher and a first structure is disposed inside the cavity, for controlling the aero-acoustic environment. The first structure for controlling the aero-acoustic environment is removeably mounted in the weapons bay, such that if the first store is exchanged for a second, different, store, the structure for controlling the aero-acoustic environment may be unmounted from the weapons bay and removed, to be exchanged for a second, different, structure for controlling the aero-acoustic environment.

12 Claims, 4 Drawing Sheets

Related U.S. Application Data continuation of application No. 14/587,968, filed on Dec. 31, 2014, now Pat. No. 9,975,635.

(51) Int. Cl.
*B64D 7/08* (2006.01)
*B64D 1/08* (2006.01)
*B64D 1/10* (2006.01)

(56) References Cited

U.S. PATENT DOCUMENTS

| | | | |
|---|---|---|---|
| 2,807,193 A | 9/1957 | Aime et al. | |
| 3,006,253 A * | 10/1961 | Parot | B64D 1/04 89/1.51 |
| 3,216,322 A * | 11/1965 | Wenger | B64D 1/04 89/1.59 |
| 3,934,846 A | 1/1976 | Maurer | |
| 3,969,977 A * | 7/1976 | Opdahl | B63G 8/32 89/1.81 |
| 4,697,764 A * | 10/1987 | Hardy | B64D 1/06 244/137.4 |
| 4,858,721 A | 8/1989 | Autie et al. | |
| 4,858,850 A * | 8/1989 | McNay | B64C 1/1484 244/1 R |
| 4,863,118 A | 9/1989 | Stallings, Jr. et al. | |
| 5,018,688 A | 5/1991 | Stallings et al. | |
| 5,582,365 A * | 12/1996 | Simmons | B64C 7/00 244/130 |
| 5,803,405 A * | 9/1998 | Ellis | B64D 1/06 244/118.1 |
| 6,098,925 A * | 8/2000 | Burdsall, II | B64C 23/06 244/118.1 |
| 6,206,326 B1 * | 3/2001 | Stanek | B64D 1/06 244/118.1 |
| 6,296,202 B1 * | 10/2001 | Stanek | B64D 1/06 244/1 N |
| 6,536,711 B1 * | 3/2003 | Conway, Jr. | B64D 1/06 244/129.5 |
| 6,663,047 B1 * | 12/2003 | Arata | B64C 25/16 244/137.1 |
| 6,739,554 B1 * | 5/2004 | Stanek | F15D 1/009 244/137.1 |
| 7,798,448 B2 * | 9/2010 | Bilanin | B64C 23/005 244/130 |
| 9,487,289 B2 * | 11/2016 | Patience | B64C 21/02 |
| 9,975,635 B2 | 5/2018 | Taylor et al. | |
| 10,442,534 B1 | 10/2019 | Taylor et al. | |
| 2016/0272318 A1 | 9/2016 | Taylor et al. | |

FOREIGN PATENT DOCUMENTS

| | | |
|---|---|---|
| GB | 744609 A | 2/1956 |
| GB | 784930 A | 10/1957 |
| JP | 2013195729 A | 9/2013 |
| WO | 2010123424 A1 | 10/2010 |
| WO | 2011081579 A1 | 7/2011 |

* cited by examiner

STRUCTURE FOR CONTROLLING THE AERO-ACOUSTIC ENVIRONMENT IN AN AIRCRAFT WEAPONS BAY

CROSS-REFERENCE TO RELATED APPLICATION

This application is a continuation of U.S. patent application Ser. No. 15/854,471, filed Dec. 26, 2017, which is a continuation of U.S. patent application Ser. No. 14/587,968, filed Dec. 31, 2014 and issued on May 22, 2018, U.S. Pat. No. 9,975,635, which claims priority to GB Application 1400179.6, filed on Jan. 6, 2014, all of which are incorporated herein by reference in their entireties for all purposes.

TECHNICAL FIELD

The present invention relates to aircraft weapons bays, a structure for controlling the aero-acoustic environment in an aircraft weapons bay, and methods of controlling the aero-acoustic environment in an aircraft weapons bay.

BACKGROUND

An aircraft weapons bay typically comprises a cavity having an opening through which stores may be deployed, and a door assembly for exposing/closing the opening of the cavity. The environment in and around the cavity, when the doors are opened during flight, can be severe. In particular, the pressure in the cavity can fluctuate significantly. The pressure fluctuations can give rise to significant aero-acoustic effects (e.g. audible noise, vibrations etc.).

Extreme aero-acoustic environments are undesirable for a number of reasons. For example, the lifetime of stores in the weapons bay may be reduced (e.g. by vibration damaging the energetic materials within the store (for example warhead and rocket motor)), electronics or other equipment in the aircraft and/or in the store may become damaged, or the flowfield may be sufficiently disrupted to undesirably affect the launch trajectory of the store.

Efforts to alleviate the severity of the aero-acoustic environment in the weapons bay have tended to focus on permanent modifications to the aircraft structure, for example by placing control surfaces upstream of the weapons bay, or by re-shaping the boundaries of the weapons bay. These have been found to have only a moderately beneficial effect on the aero-acoustics. Furthermore, these are typically generic solutions, and tend not to be tailored to specific stores/configurations of the weapons bay.

SUMMARY

It is desirable to provide an aircraft weapons bay which reduces or mitigates at least some of the above-mentioned problems.

According to a first aspect of the invention, there is provided an aircraft comprising a weapons bay, the weapons bay comprising a cavity having an opening through which stores may be deployed, and a door assembly for exposing/closing the opening of the cavity. A first store held in the cavity (e.g. via a launcher) and a first structure, disposed in the cavity, for controlling the aero-acoustic environment. By placing the structure for controlling the aero-acoustic environment inside the cavity (rather than, for example upstream of it) the structure can directly influence the flowfield in the cavity. This may enable more effective control of the aero-acoustic environment. The first structure for controlling the aero-acoustic environment is removeably mounted in the weapons bay, such that if the first store is exchanged for a second, different, store, the structure for controlling the aero-acoustic environment may be unmounted from the weapons bay and removed, to be exchanged for a second, different, structure for controlling the aero-acoustic environment. Such an arrangement enables different structures for controlling the aero-acoustic environment to be fitted in the weapons bay dependent on, for example, the choice/layout of stores in the weapons bay. The structure for controlling the aero-acoustic environment can thus be tailored to the specific weapon bay it is fitted in (e.g. dependent on both the shape of the weapon bay and the nature/layout of the store(s)), rather than requiring a re-design of the aircraft weapons bay itself.

The first and second structures for controlling the aero-acoustic environment are preferably independent of the aircraft structure. The structures for controlling the aero-acoustic environment may be attachable to/detachable from the weapons bay. The structures for controlling the aero-acoustic environment are preferably repeatedly attachable to/detachable from the weapons bay.

The structures for controlling the aero-acoustic environment may be associated with the respective store (for example the structure for controlling the aero-acoustic environment may be indirectly coupled to the store itself). The structures for controlling the aero-acoustic environment may be associated with the launcher of the store. The structures for controlling the aero-acoustic environment are preferably associated with the respective store and/or launcher such that the structure is installed in the weapons bay simultaneously with the fitting of, or preparations to fit, the respective store and/or launcher. The structure for controlling the aero-acoustic environment may be connected to the launcher. The structure for controlling the aero-acoustic environment may be connected to the launcher mounting. Having the structure for controlling the aero-acoustic environment associated with the launcher enables the structure for controlling the aero-acoustic environment to be easily fitted inside the cavity (for example when fitting the launcher to the weapons bay). The structure for controlling the aero-acoustic environment preferably remains in the weapons bay after launch of the respective store. The structure for controlling the aero-acoustic environment may be associated with the respective store and/or the launcher in such a way that it can be fitted with the store and/or launcher, but remains in the weapons bay after launch of the store.

The first structure for controlling the aero-acoustic environment is disposed inside the cavity. The first structure for controlling the aero-acoustic environment is preferably exposed to airflow within the cavity. The first structure for controlling the aero-acoustic environment may therefore not need to be reliant on control devices external to the weapons bay. The first structure for controlling the aero-acoustic environment is preferably wholly inside the cavity.

The first structure for controlling the aero-acoustic environment is preferably a noise reduction structure. By placing a noise reduction structure inside the cavity the structure can directly influence the flowfield in the cavity that might otherwise be the source of excessive noise.

The first structure for controlling the aero-acoustic environment, has preferably been designed to reduce aero-acoustic effects when the first store is held in the cavity. The second structure for controlling the aero-acoustic environment, has preferably been designed to reduce aero-acoustic effects when the second store is held in the cavity.

The structures for controlling the aero-acoustic environment may take a number of forms. It will be appreciated that features described herein with reference to 'the structure for controlling the aero-acoustic environment in the weapons bay', are equally applicable to both the first structure and/or the second, different, structure, for controlling the aero-acoustic environment in the weapons bay.

In some embodiments, the structure for controlling the aero-acoustic environment may comprise a lateral wall extending in a direction across the width of the cavity and extending from the launcher towards the opening. The lateral wall may be positioned to at least one side of the store. The lateral wall may be positioned either side of the store. The lateral wall may, in principle, be two separate elements either side of the store. More preferably, the lateral wall is a single element extending either side of the store. The lateral wall may have a cut-away to provide free passage of the store. A lateral wall is thought to disrupt airflow in the cavity. In particular, the lateral wall may restrict the distance over which pressure fluctuations can propagate within the weapons bay during use, thereby reducing aero-acoustic effects. The lateral wall preferably extends from the launcher to the opening (for example to the underside of the bay doors when closed). Having the lateral wall extend the full depth of the cavity is thought to maximize the aero-acoustic-reducing effect. The lateral wall may extend across only some of the width of the cavity. The lateral wall may extend across the full width of the cavity. The structure for controlling the aero-acoustic environment may comprise a flange extending from the lateral wall in a direction parallel to the opening of the cavity. The flange may thereby reduce the extent of the cavity exposed to freestream airflow during use (when the bay doors are open), thus reducing noise. The structure for controlling the aero-acoustic environment may comprise a plurality of the above-mentioned lateral walls, each being spaced apart along the length of the weapons bay. In some embodiments the lateral walls may be thin walls. In some embodiments they may be relatively thick. For example the wall may be sufficiently thick, such that the face of the wall in the depth direction can be used to contribute to noise reduction. The laterals wall(s) may be arranged such that they are inclined to the air flow in the weapons bay during use. The laterals wall(s) may, in principle, be at any angle to the longitudinal axis of the weapons bay. The laterals wall(s) may be at >45 degrees to the longitudinal axis of the weapons bay. The laterals wall(s) may be generally downwardly extending from the roof of the weapons bay.

In other embodiments, the structure for controlling the aero-acoustic environment may comprise an infill-surface arranged to reduce the extent of the cavity exposed to freestream airflow during use. The in-fill surface may extend substantially parallel to the opening. The in-fill surface may extend across the majority of the opening. The structure for controlling the aero-acoustic environment may further comprise a surround surface. The surround surface may extend from the infill surface and behind the store. The surround surface may thereby create a channel out of which the store may be deployed, whilst still limiting the extent of the cavity exposed to the freestream airflow.

In other embodiments, the structure for controlling the aero-acoustic environment may comprise a baffle (directly or indirectly) between the store and the side wall of the cavity. The baffle is any structure adapted to reduce the noise (in comparison to the baffle being absent). The baffle may comprise a lateral wall extending in a direction across the width of the cavity. The baffle may comprise a longitudinal wall extending in a direction along the length of the cavity. The wall(s) may be arranged such that they are inclined to the flow in the weapons bay during use. The lateral and longitudinal wall(s) may, in principle, be at any angle to the respective longitudinal and lateral axes of the weapons bay. The wall(s) may be at >45 degrees to the respective axis of the weapons bay. The wall(s) may be generally downwardly extending from the roof of the weapons bay.

In some embodiments, the baffles effectively join to form a divider. Accordingly, the structure for controlling the aero-acoustic environment may comprise a divider for dividing the cavity into a plurality of secondary cavities. The divider preferably restricts the distance over which pressure fluctuations can propagate within the weapons bay during use, thereby reducing noise. The divider may comprise a laterally-extending wall. The divider may comprise a longitudinally-extending wall. The divider may comprise both laterally and longitudinally extending walls.

In all of the above-described arrangements, the structure for controlling the aero-acoustic environment may comprise an unperforated surface. However, the structure for controlling the aero-acoustic environment preferably includes at least one perforation, and more preferably a plurality of perforations. Embodiments comprising a perforated surface are considered especially beneficial as the perforated surface may alleviate aerodynamic loads on the structure for controlling the aero-acoustic environment and/or improve the aero-acoustic control function of the structure. The structure for controlling the aero-acoustic environment may include an access hatch for providing access to the other side of the structure for controlling the aero-acoustic environment. This is especially beneficial because it still enables the weapons bay to act as an access point to various aircraft systems. The structure for controlling the aero-acoustic environment may include a cut out for accommodating other furniture in the weapons bay (for example pipework or equipment attached to the sidewalls of the weapons bay). A cut out may be defined as a variation of the form of a component that allows the component to be placed around, against or in close proximity to a second component in a manner that would otherwise not be possible.

The aircraft may comprise a plurality of stores held in the cavity. The structure for controlling the aero-acoustic environment may have been designed to reduce aero-acoustic effects when the plurality of stores is held in the cavity. The structure for controlling the aero-acoustic environment is removeably mounted in the weapons bay, such that if the plurality of stores are exchanged for a second, different, plurality of stores, the structure for controlling the aero-acoustic environment may be unmounted from the weapons bay and removed, to be exchanged for a second, different, structure for controlling the aero-acoustic environment. The plurality of stores, may all be of the same type, or may be a collection of different types of store.

According to another aspect of the invention there is provided a removeable structure for controlling the aero-acoustic environment in a weapons bay, for use as the first structure for controlling the aero-acoustic environment a described herein.

In principle, features described herein with reference to embodiments of the invention may be combined. For example in an embodiment comprises a plurality of stores, each of a plurality of stores may be disposed in a respective secondary cavity, and the structure for controlling the aero-acoustic environment may also comprise a plurality of lateral walls, each lateral wall extending either side of a respective store.

The aircraft may be manned (for example a piloted aircraft). The aircraft may be unmanned (i.e. a UAV). The aircraft may be a fixed wing aircraft. The aircraft may be a rotary wing aircraft.

The aircraft may be arranged to travel faster than Mach 0.1, and more preferably faster than Mach 0.5. The aircraft may be a super-sonic aircraft.

The store may be a guided weapon, a bomb, or other store such as a decoy, jammer, or fuel tank.

According to another aspect of the invention, there is provided a store in combination with a structure for controlling the aero-acoustic environment, for use as the store and the structure for controlling the aero-acoustic environment described herein.

According to another aspect of the invention, there is provided a kit of parts for controlling the aero-acoustic environment in an aircraft weapons bay. The kit comprises: a first store, a second, different, store, a first structure for removeably mounting in a cavity of the weapons bay, the first structure being pre-designed to reduce aero-acoustic effects in the weapons bay when the first store is held in the weapons bay; and a second, different, structure for removeably mounting in the cavity of the weapons bay, the second structure being pre-designed to reduce aero-acoustic effects in the weapons bay when the second store is held in the weapons bay; such that the first and second structures for controlling the aero-acoustic environment may be exchanged in dependence on whether the first or second store is to be held in the weapons bay.

According to another aspect of the invention, there is provided a method of tailoring two structures for controlling the aero-acoustic environment in an aircraft weapons bay, the method comprising the steps of: assessing the aircraft weapons bay; assessing the layout of the first store in the weapons bay; and designing a first removeable structure for controlling the aero-acoustic environment such that, when disposed inside the weapons bay, the first structure would reduce noise generated by the weapons bay and by the first store in the bay. The method may comprise the step of assessing a second store when it is in the weapons bay instead of the first store and designing a second removeable structure for controlling the aero-acoustic environment such that, when disposed inside the weapons bay, the second structure would reduce aero-acoustic effects generated by the weapons bay and the second store in the bay. Weapons bays are typically designed to have the flexibility to accommodate a variety of different stores. Thus, there tends to be some spare space in a bay when occupied by any one specific type of store or specific layout of stores. Tailoring the structures for controlling the aero-acoustic environment (for use with the respective first or second store), enables this otherwise unoccupied space to be used for reducing aero-acoustic effects.

According to another aspect of the invention, there is provided a method of modifying a weapons bay on an aircraft to reduce aero-acoustic effects generated by the weapons bay, the method comprising the steps of: providing an aircraft weapons bay comprising a cavity having an opening through which stores may be deployed, and a door assembly for exposing/closing the opening of the cavity, unmounting a first, removeable, structure for controlling the aero-acoustic environment inside the cavity, and subsequently mounting a second structure for controlling the aero-acoustic environment inside the cavity, to replace the first structure. The first structure is pre-designed for reducing aero-acoustic effects when the first store is held in the cavity and the second structure, is pre-designed for reducing aero-acoustic effects when a second, different, store is held in the cavity.

Any features described with reference to one aspect of the invention are equally applicable to any other aspect of the invention, and vice versa.

BRIEF DESCRIPTION OF THE DRAWINGS

Example embodiments of the invention will now be described by way of example only and with reference to the accompanying drawings, of which.

DETAILED DESCRIPTION

Figure 1A:
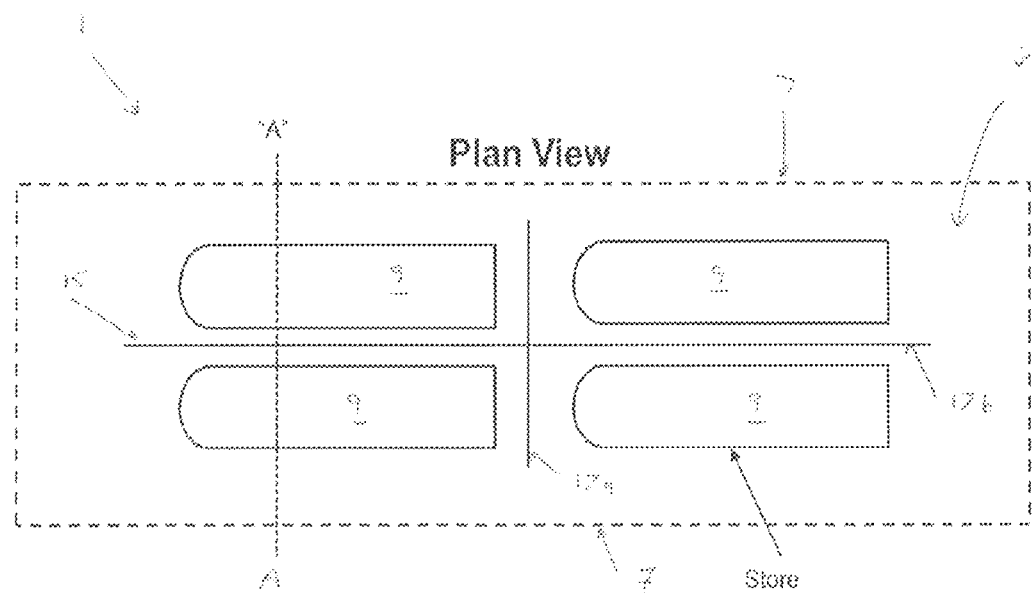
FIGS. 1a and 1b are schematic plan and sectional views respectively, of an aircraft weapons bay according to a first embodiment of the invention.
Figure 1B:
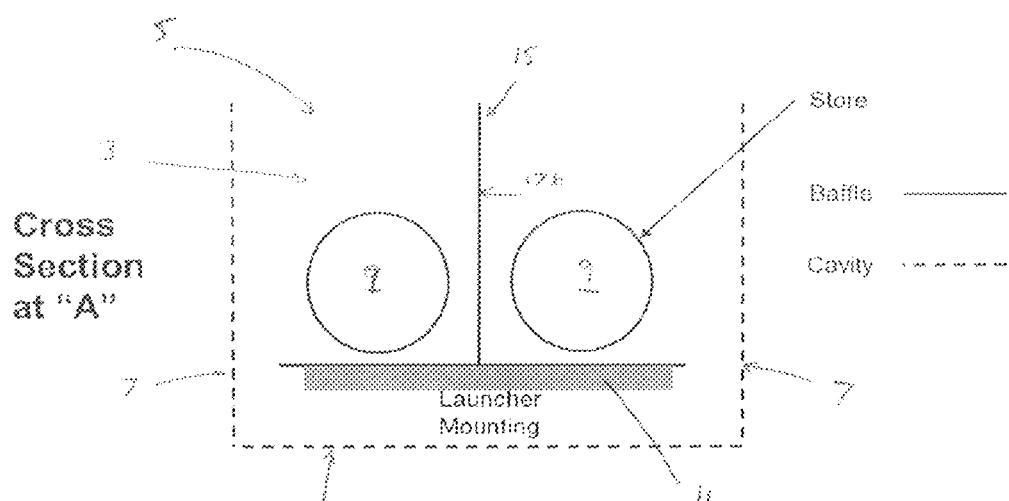

FIG. 1a is a plan view of a weapons bay in the underside of an aircraft (not shown) according to a first embodiment of the invention. FIG. 1b is a section view, taken through the line A-A. The weapons bay 1 is generally cuboidal and comprises a cavity 3 (denoted by dotted lines in FIGS. 1a and 1b). The weapons bay has side-walls 7 and an opening 5 through which stores 9 may be deployed. The weapons bay also comprises a door assembly (not shown) for exposing/closing the opening 5 of the cavity 3. Four missiles 9 are held in the cavity via a launcher 11 from which each missile can be independently launched. The launcher 11 attaches to the roof 13 of the weapons bay 1 by way of a launcher mounting. The environment in and around the cavity, when the doors are opened during flight, can be severe. In particular, there can be significant aero-acoustic effects. Extreme aero-acoustic effects are undesirable, and the weapons bay according to the first embodiment, comprises a structure for controlling the aero-acoustic environment 15 to mitigate excessive aero-acoustic effects.

The structure for controlling the aero-acoustic environment comprises two baffles 17a, 17b arranged between the stores. A first baffle 17a is a lateral wall extending in a direction across the width of the cavity (but not joining either sidewall). The second baffle is a longitudinal wall extending in a direction along the length of the cavity (but not joining either end wall). Both baffles extend downwardly from the launcher 11 to the opening, to maximize their effect on the flow in the cavity. Both the baffles are contoured (not shown in FIGS. 1a-1b) and are both perforated to reduce the aerodynamic loading on them and to improve their function as baffles (i.e. in reducing noise).

In contrast to prior art structures for controlling the aero-acoustic environment in weapons bays, the structure for controlling the aero-acoustic environment 15 is located wholly inside the cavity 3. The present invention recognizes that some of the space in the cavity 3 can be used for controlling aero-acoustic effects, and that by placing a structure for controlling such effects inside the cavity, the structure can directly influence the flowfield in the cavity.

In contrast to prior art structures for controlling the aero-acoustic environment for weapons bays, the structure for controlling the aero-acoustic environment 15 is also removeably mounted in the weapons bay. In the first embodiment, the noise-reducing element is attached to the launcher 11. The structure for controlling the aero-acoustic environment can therefore be installed in the weapons bay when fitting the launcher, and can be removed from the weapons bay when removing the launcher (e.g. after use of the store or if replacement of the store is otherwise required). Since the structure for controlling the aero-acoustic environment is separate from the aircraft structure, it can be tailored to the specific weapon bay it is fitted in, taking into account the nature, and layout of the stores, rather than requiring a re-design of the aircraft weapons bay itself.

Figure 2A:
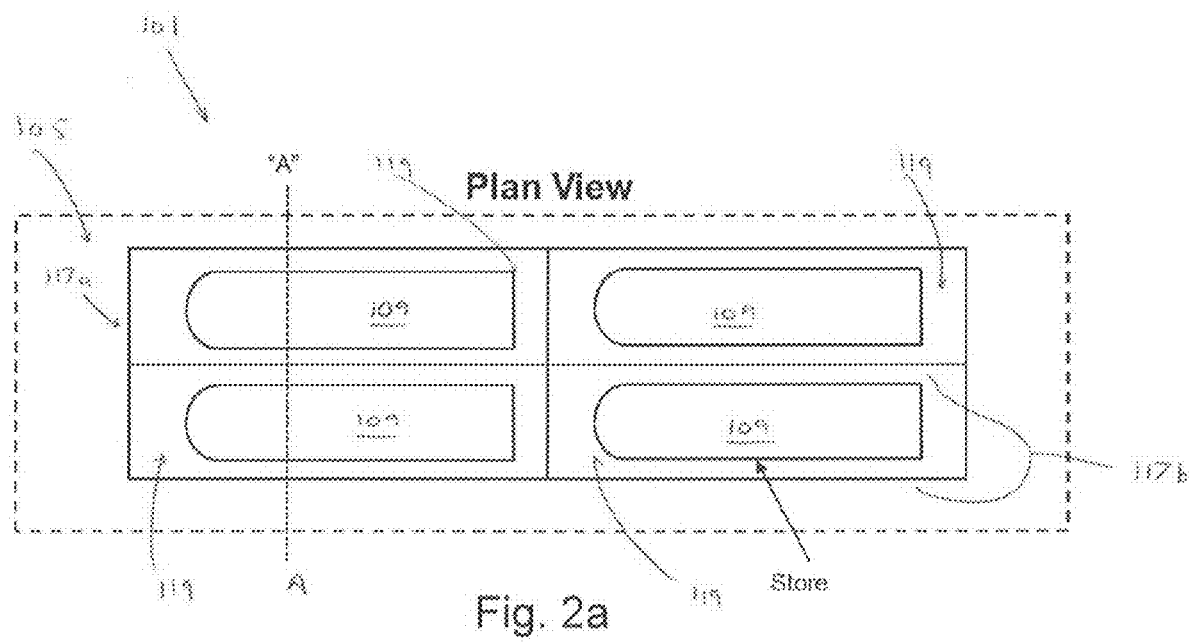
FIGS. 2a and 2b are schematic plan and sectional views respectively, of an aircraft weapons bay according to a second aspect of the invention.
Figure 2B:
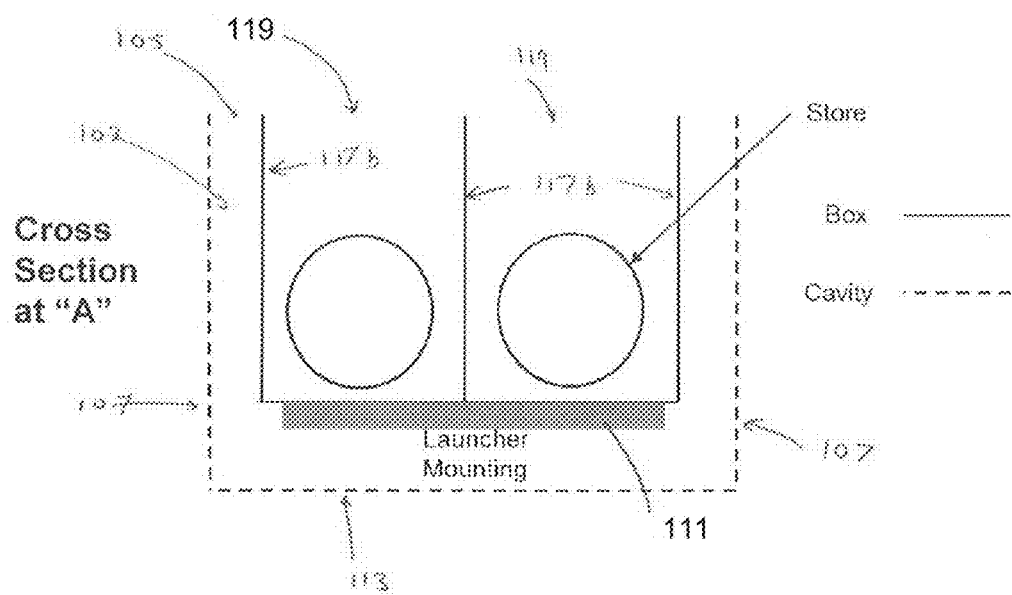

FIG. 2a is a plan view of a weapons bay in the underside of an aircraft (not shown) according to a second embodiment of the invention. FIG. 2b is a section view, taken through the line A-A. Features in the second embodiment of the invention that correspond to similar features in the first embodiment of the invention, are shown with the same reference numerals as in the first embodiment, but with the addition of the prefix '1' (or '10' where appropriate).

In contrast to the first embodiment, the structure for controlling the aero-acoustic environment 115 in FIGS. 2a and 2b comprises additional lateral and longitudinal walls 117a/b such that the cavity 105 is divided into four secondary cavities 119, each secondary cavity containing a store 109. Dividing the cavity into secondary cavities is thought to reduce noise by restricting the distance over which pressure fluctuations can propagate within the weapons bay during use.

In common with the structure for controlling the aero-acoustic environment in the first embodiment, the structure for controlling the aero-acoustic environment is connected to the launcher 111 and is thus removeable from the aircraft weapons bay.

Figure 3A:
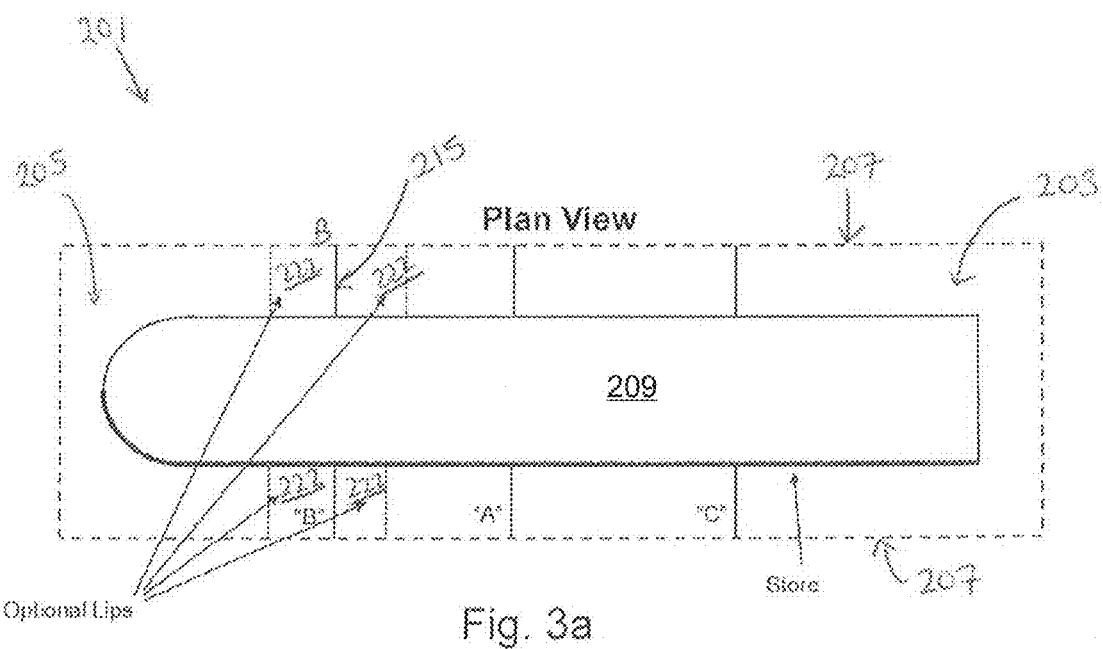
FIGS. 3a and 3b are schematic plan and sectional views respectively, of an aircraft weapons bay according to a third aspect of the invention.
Figure 3B:
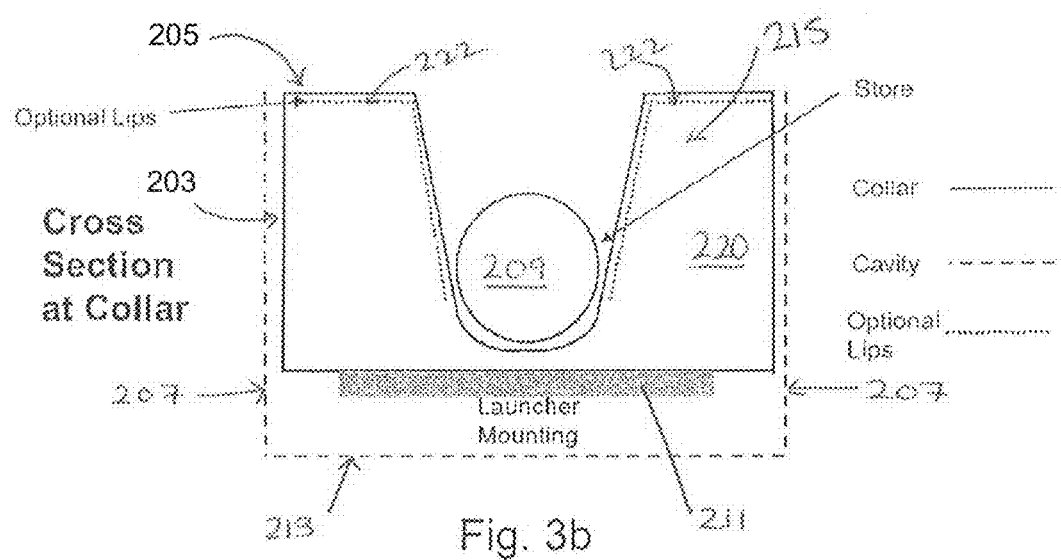

FIG. 3a is a plan view of a weapons bay in the underside of an aircraft (not shown) according to a third embodiment of the invention. FIG. 3b is a section view, taken through the line B-B. Features in the third embodiment of the invention that correspond to similar features in the first embodiment of the invention, are shown with the same reference numerals as in the first embodiment, but with the addition of the prefix '2' (or '20' where appropriate).

In contrast to the second embodiment, the structure for controlling the aero-acoustic environment 215 in FIGS. 3a and 3b comprises a lateral wall 220 extending in a direction across the width of the cavity 203 (but not joining either sidewall). The lateral wall 220 extends as a single element across the majority of the width of the cavity including behind the missile 209. The lateral wall extends downwardly from the launcher 211 towards the opening 205. The downward extent of the lateral wall varies with distance across the cavity and is reduced in the center region where the wall 220 passes between the missile 209 and launcher 211 to form a cut-away. Either side of the missile 209 the wall extends downwardly from the launcher 211 to the opening 205, to maximize its effect on the flow in the cavity. Flanges 222 extend parallel to the opening 205 at the downward edge of the wall 220 (except in the center region) to further limit the extent of the cavity exposed to the freestream airflow.

In common with the structure for controlling the aero-acoustic environment in the first and second embodiments, the structure for controlling the aero-acoustic environment of the third embodiment is connected to the launcher 211 and is thus removable from the aircraft weapons bay.

Figure 4A:
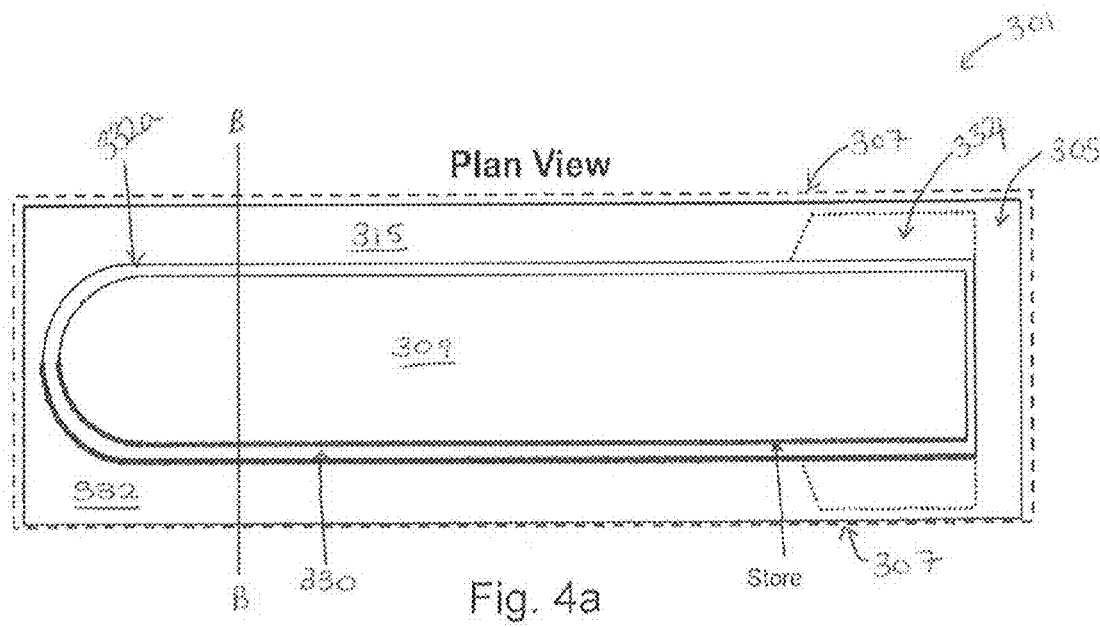
FIGS. 4a and 4b are schematic plan and sectional views respectively, of an aircraft weapons bay according to a fourth aspect of the invention.
Figure 4B:
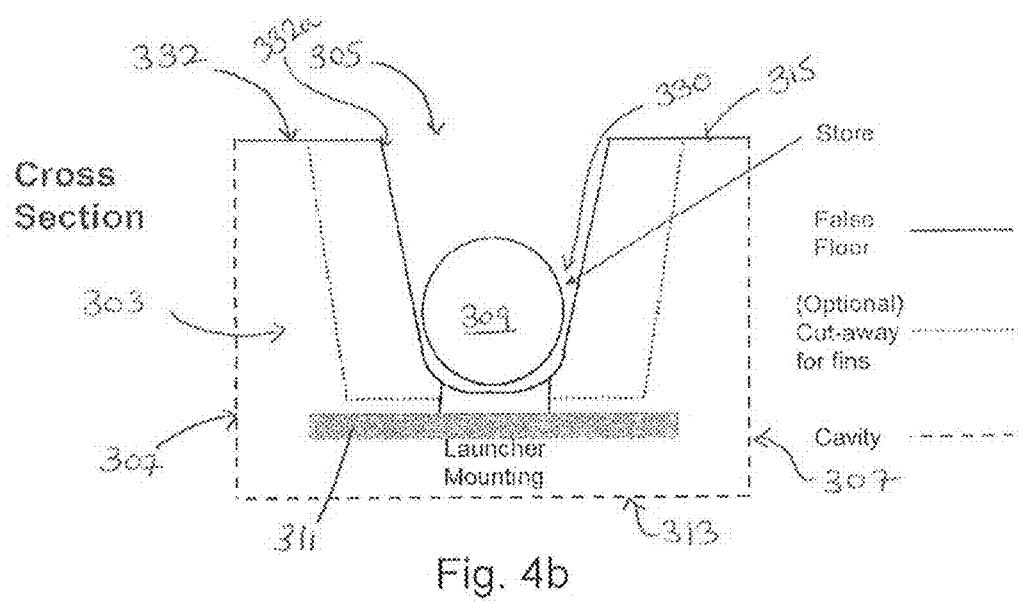

FIG. 4a is a plan view of a weapons bay in the underside of an aircraft (not shown) according to a fourth embodiment of the invention. FIG. 4b is a section view, taken through the line BB. Features in the fourth embodiment of the invention that correspond to similar features in the first embodiment of the invention, are shown with the same reference numerals as in the first embodiment, but with the addition of the prefix '3' (or '30' where appropriate).

In contrast to the first, second and third embodiments, the structure for controlling the aero-acoustic environment 315 in FIGS. 3a and 3b comprises an infill-surface 332. The infill-surface 332 extends across the length and width of the cavity 303, excluding the area above the missile, at the level of, and substantially parallel to, the opening 305 (it can be thought of as a version of the flange 222 of the third embodiment, but taken to an extreme extension. An inner edge 332a of infill-surface 332 surrounds the missile 309. A surround surface 330 extends from the inner-edge 332a of the infill-surface and behind the missile 309 to form a recess in which the missile 309 is located prior to launch. The recess formed by surround surface 330 is shaped to accommodate the missile 309, including its fins 334 (shown in dotted lines), when located on the launcher 311. Providing the infill surface 332, particularly in combination with the surround surface 330, reduces the extent of the cavity exposed to the freestream airflow during use. The recess formed by the surround surface 330 creates a channel out of which the missile 309 may be deployed.

In common with the structure for controlling the aero-acoustic environment in the first, second, and third embodiments, the structure for controlling the aero-acoustic environment of the fourth embodiment is connected to the launcher 211 and is thus removable from the aircraft weapons bay.

Whilst the present invention has been described and illustrated with reference to particular embodiments, it will be appreciated by those of ordinary skill in the art that the invention lends itself to many different variations not specifically illustrated herein. For example, the cavity need not necessarily be cuboidal, and may be any shape. The walls need not be vertical (for example they may be inclined at an acute angle to the freestream flow). The structure for controlling the aero-acoustic environment need not necessarily be attached to the launcher. It may, for example, be releasable attached to the side wall of the weapons bay. Furthermore, features described with reference to one embodiment may be equally applicable to another embodiment. For example, the arrangement in FIGS. 3a and 3b may be applied to each of the stores in FIGS. 2a and 2b.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

We claim:
1. An aircraft comprising:
a weapons bay, the weapons bay comprising a cavity having an opening for deploying stores, and a door assembly for exposing/closing the opening of the cavity,
a first store held in the cavity via a launcher; and a first structure, disposed inside the cavity, for controlling the aero-acoustic environment to reduce aero-acoustic effects when used in conjunction with the first store, wherein the first structure for controlling the aero-acoustic environment is removably mounted in the weapons bay, such that when the first store is exchanged for a second store of a different type than the first store, the first structure for controlling the aero-acoustic environment is unmounted from the weapons bay and removed, to be exchanged for a second structure of a different type than the first structure for controlling, differently than the first structure, the aero-acoustic environment to reduce aero-acoustic effects when used in conjunction with the second store.

2. The aircraft according to claim 1, wherein the first structure comprises a baffle, wherein the baffle is provided between the first store and a side wall of the cavity.

3. The aircraft according to claim 2, wherein the baffle comprises a lateral wall extending in a direction across a width of the cavity and extending from the launcher towards the opening of the cavity.

4. The aircraft according to claim 2, wherein the baffle comprises a longitudinal wall extending in a direction along a length of the cavity and extending from the launcher towards the opening of the cavity.

5. The aircraft according to claim 1, wherein the first structure comprises two baffles, wherein a first baffle comprises a lateral wall extending across the width of the cavity and extending from the launcher towards the opening of the cavity, and a second baffle comprises a longitudinal wall extending along the length of the cavity, and extending from the launcher towards the opening of the cavity.

6. The aircraft according to claim 5, wherein the aircraft comprises a second store, and wherein the first baffle and the second baffle join to form a divider between the first and the second stores, thereby dividing the cavity into at least two sub-cavities, each cavity housing a store.

7. The aircraft according to claim 1, wherein the first structure comprises a multiplicity of baffles, and wherein each of the baffles comprises either a lateral wall extending across the width of the cavity and extending from the launcher towards the opening of the cavity, or a longitudinal wall extending along the length of the cavity and extending from the launcher towards the opening of the cavity.

8. The aircraft according to claim 7, wherein the multiplicity of baffles join to form a plurality of dividers, thereby dividing the cavity into a plurality of sub-cavities, and wherein the aircraft comprises a plurality of stores, each store occupying a sub-cavity.

9. The aircraft according to claim 1, wherein the first structure for controlling the aero-acoustic environment, has been designed to reduce aero-acoustic effects when the first store is held in the cavity.

10. The aircraft according to claim 1, wherein the first structure for controlling the aero-acoustic environment is associated with the first store and/or the launcher, such that the first structure for controlling the aero-acoustic environment is configured for installation in the weapons bay simultaneously with the fitting of the first store and/or the launcher.

11. A store in combination with a structure for controlling the aero-acoustic environment, for use as a first store and a first structure for controlling the aero-acoustic environment, in an aircraft comprising a weapons bay, the weapons bay comprising a cavity having an opening through which stores are able to be deployed, and a door assembly for exposing/closing the opening of the cavity; the first store held in the cavity via a launcher; and the first structure, disposed inside the cavity, for controlling the aero-acoustic environment to reduce aero-acoustic effects when used in conjunction with the first store, wherein the first structure for controlling the aero-acoustic environment is removably mounted in the weapons bay, such that when the first store is to be exchanged for a second store of a different type than the first store, the first structure for controlling the aero-acoustic environment is unmounted from the weapons bay and removed, to be exchanged for a second structure of a different type than the first structure for controlling, differently than the first structure, the aero-acoustic environment to reduce aero-acoustic effects when used in conjunction with the second store.

12. A removable structure for controlling the aero-acoustic environment in a weapons bay, for use as a first structure for controlling the aero-acoustic environment, in an aircraft comprising a weapons bay, the weapons bay comprising a cavity having an opening through which stores are able to be deployed, and a door assembly for exposing/closing the opening of the cavity; a first store held in the cavity via a launcher; wherein the first structure is disposed inside the cavity, for controlling the aero-acoustic environment to reduce aero-acoustic effects when used in conjunction with the first store, wherein the first structure for controlling the aero-acoustic environment is removably mounted in the weapons bay, such that when the first store is to be exchanged for a second store of a different type to the first store, the first structure for controlling the aero-acoustic environment is able to be unmounted from the weapons bay and removed, to be exchanged for a second structure of a different type than the first structure for controlling, differently than the first structure, the aero-acoustic environment to reduce aero-acoustic effects when used in conjunction with the second store.

* * * * *